(12) United States Patent
Jenkins et al.

(10) Patent No.: US 7,169,433 B2
(45) Date of Patent: Jan. 30, 2007

(54) SEASONING STICK AND METHOD AND APPARATUS FOR PREPARING FOODS

(75) Inventors: Nevin C. Jenkins, 1760 S. Dimensions Ter., Homosassa, FL (US) 34448; Martin Fleit, Miami, FL (US)

(73) Assignee: Nevin C. Jenkins, Homosassa, FL (US)

( * ) Notice: Subject to any disclaimer, the term of this patent is extended or adjusted under 35 U.S.C. 154(b) by 265 days.

(21) Appl. No.: 10/678,969

(22) Filed: Oct. 2, 2003

(65) Prior Publication Data

US 2004/0121063 A1 Jun. 24, 2004

Related U.S. Application Data

(63) Continuation-in-part of application No. 10/138,052, filed on May 3, 2002, now abandoned.

(51) Int. Cl.
*A23L 1/22* (2006.01)

(52) U.S. Cl. ............ 426/638; 426/454; 426/512; 426/517; 426/519; 426/652; 426/658; 426/601

(58) Field of Classification Search ............ 426/638, 426/650, 652, 658, 601, 454, 512, 519, 517
See application file for complete search history.

(56) References Cited

U.S. PATENT DOCUMENTS

| | | | | |
|---|---|---|---|---|
| 2,887,035 A | * | 5/1959 | De Seversky | 99/494 |
| 3,554,769 A | * | 1/1971 | Caillout | 426/650 |
| 5,468,286 A | * | 11/1995 | Wai-Chiu et al. | 106/205.01 |
| 6,126,979 A | * | 10/2000 | Herreid et al. | 426/285 |

FOREIGN PATENT DOCUMENTS

BE 890237 * 1/1982
EP 1138211 A1 * 3/2000

* cited by examiner

*Primary Examiner*—Helen Pratt
(74) *Attorney, Agent, or Firm*—Martin Fleit; Paul D. Bianco; Fleit Kain Gibbons Gutman Bongini & Bianco, P.L.

(57) ABSTRACT

A solid seasoning product in the form of a stick, rod, thread, band, bead, pellet or ribbon from 20 mils to 250 mils thick and having a geometry as a shaped mass that enables the product to be inserted into or mixed with food comprising meat, poultry, rice, grains or other particulate foods prior to heating to prepare the food. The product is composed of a binder matrix holding a seasoning or mixture of seasonings. The binder disintegrates during heating of the food to release the seasoning.

2 Claims, 2 Drawing Sheets

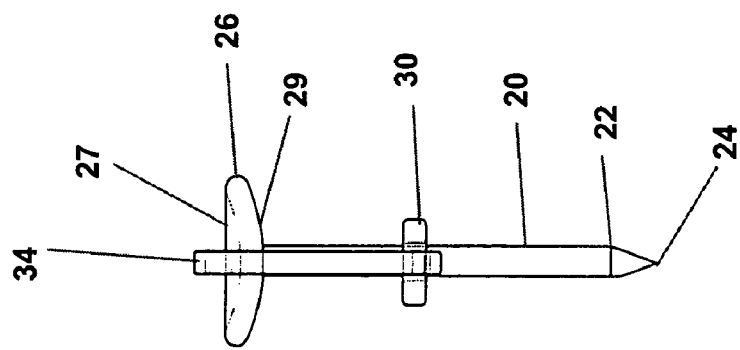
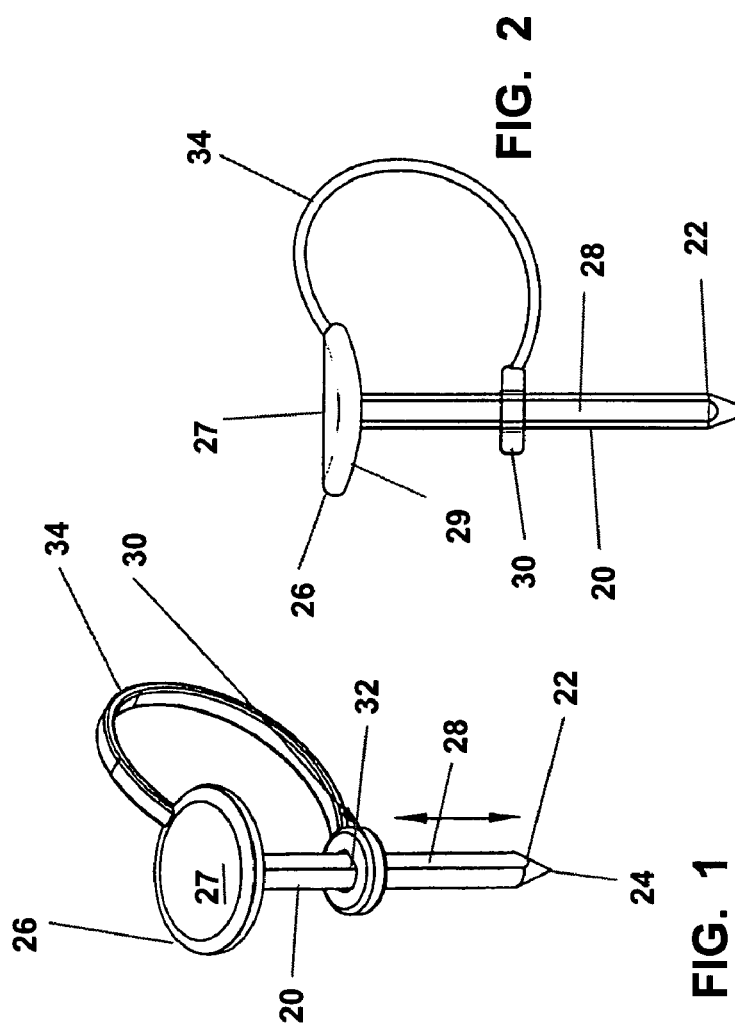
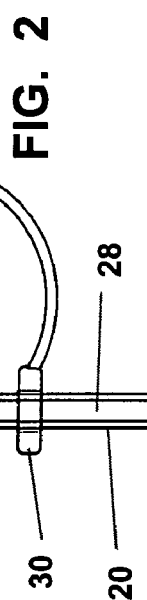
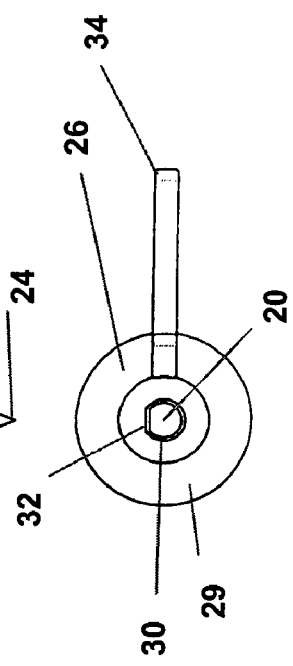

SEASONING STICK AND METHOD AND APPARATUS FOR PREPARING FOODS

RELATED APPLICATION

This application is a continuation-in-part of application Ser. No. 10/138,052 filed May 3, 2002 now abandoned.

BACKGROUND OF THE INVENTION

1. Field of the Invention

The present invention relates to a seasoning stick product, and additionally to a method and apparatus for preparing and seasoning foods, including meats and poultry, on the one hand, and other foods, such as grains, rice and other particulate foods, and to a device to be used in seasoning food.

2. Prior Art

The seasoning of food in preparation for cooking, as well as, the seasoning of food during cooking is well known in the art. Usually the seasoning, in the form of a powder or granulate, is sprinkled onto the food, or mixed into the food, prior to and/or during cooking, broiling, baking or so forth. Whereas these techniques are satisfactory in general for foods, in the case of meats, fish and poultry, the texture and density of this type of food is such that sprinkling powders on top of the food may be unsatisfactory from several viewpoints. For example, if meat, fish or poultry is being broiled or baked, the high heat at the surface of the meat or poultry may be such as to cause any seasoning on the surface to burn or scorch, rendering it ineffective, or worse, giving a bad taste to the broiled food. Accordingly, to avoid this problem, frequently, the food is marinated or a liquid or sauce is applied to the surface of the food during heating by basting. In either case, penetration of the seasoning throughout the food is problematic.

SUMMARY OF THE INVENTION

Accordingly, it is the principal object of the present invention to provide a new form of seasoning (flavors, spices, condiments and herbal ingredients) for foods that enables the disadvantages of the prior art to be overcome. This is accomplished by providing the seasoning as a solid in the form of an elongated stick, rod, thread, bead, pellet or band of relatively small cross section, e.g. less than about 0.25 inches in diameter and preferably less than about 0.1 inch in diameter with a preferred diameter of about 0.05 inches, although some forms of the invention may have greater applicability if the diameter is very small, even substantially less that 0.05 inches (down to 20 mils) so that it resembles very thin spaghetti or is threadlike, such as like "angel hair". Also, the invention contemplates beads and/or pellets of small diameter and may be elongated or spherical or cylindrical.

This novel form of seasoning is made by mixing the seasoning desired with an FDA approved food binder having the desired characteristics and then compacting, compressing or extruding to give the mixture sufficient solid form and rigidity to enable the resulting product, in the form of a stick, rod, thread or band, to be inserted into meat, fish or poultry with or without the aid of a novel device described herein to create a suitable opening of sufficient size and depth to accommodate the insertion. The product may be made short so that it is completely inserted into the meat, fish or poultry, or the product can have a greater length and when inserted, to be simply broken off at the surface of the meat or poultry to take away or remove the projecting portion for subsequent use. Also, if in the form of a bead or pellet, it can be mixed with a food, like rice, that requires cooking for its preparation, whereby the spices or seasonings are released during cooking and incorporated into the food.

Other objects and advantages of the invention will be readily understood from the following detailed description of preferred embodiments of the method and apparatus and the product and the novel device for making openings when taken in conjunction with the appended drawings.

BRIEF DESCRIPTION OF THE DRAWINGS

FIG. 1 shows in perspective a novel device for making openings in food, particularly, meat, fish and poultry.

FIG. 2 shows in a side view the device of FIG. 1.

FIG. 3 shows in a side view taken from another angle the device of FIG. 1.

FIG. 4 shows in a bottom view the device of FIG. 1.

DETAILED DESCRIPTION OF PREFERRED EMBODIMENTS

Figure 5:
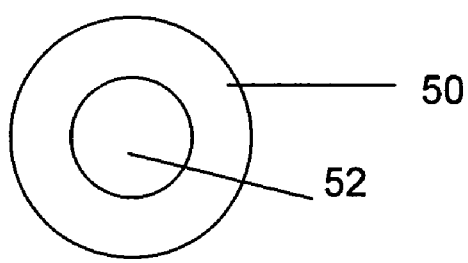
FIG. 5 shows a cross section of a product comprised of two layers.

The invention will now be described in detail regarding preferred embodiments. The novel product of the present invention comprises seasoning (flavors, spices, condiments and herbal ingredients) in a predetermined or selected solid form obtained by mixing selected seasonings in powder form with an FDA approved food binder in a ratio of from about 0.1% by weight to about 10% by weight of binder with the remainder being essentially seasoning powder having a particle size of from about 2 mils to about 10 mils diameter. The amount of binder is a function of bonding the seasoning powder or establishing a matrix for holding and bonding the seasoning powder to obtain a solid product that can be pressed into meat, fish or poultry, preferably, but insertion into vegetables is not precluded from the broadest concept of the invention. The resulting solid product must not be so friable that it will breakup during insertion. The preferred ratio of binder to seasoning is from about 0.1% to about 5% to establish the appropriate bonding or matrix structure during compression, compaction or extrusion. There may be, of course, additional ingredients in the mixture such as lubricants, mold release agents, and the like, which are present to enhance the forming of the mixture into a suitable solid in accordance with the concepts of the invention. Such additional ingredients would be known to those skilled in the art from the literature and from a manufacturer's specifications and recommendations for use of a particular binder. The mixture is then converted into the solid form by compression, compaction or extruding, or by any other technique that will produce the desired solid form of the invention. Again, these techniques are well known to those skilled in the art from the literature and a manufacturer's specifications and recommendations for use of a particular binder.

In this respect, the predetermined or preselected solid form is one of a stick, rod, thread, band, bead, pellet and ribbon having a relatively small cross section and diameter or thickness, e.g. less than about 0.25 inches in diameter, and preferably less than about 0.1 inch in diameter, with a preferred diameter of about 0.05 inches, although some forms of the invention may have greater applicability if the diameter is very small, even substantially less that 0.05 inches (down to 20 mils) so that it resembles very thin spaghetti or is threadlike, such as "angel hair". The geometry of the product from the standpoint of periphery or cross section may be circular (round), elliptical, rectangular, ribbon-like, thread-like, polygonal or irregular. If the product is in band, bead, pellet, bar or ribbon form, the thickness of the product may vary from about 20 mils to about 250 mils. The length of the product may be about 0.25 to 1 inch, so that it can be fully inserted into an opening in the meat, fish or poultry, but it also, could be of greater lengths, up to about 18 inches, and used by inserting into an opening to the extent possible, with the projecting portion then broken off and removed for subsequent use. Such a length would be highly suitable and would facilitate multiple insertions being made at spaced intervals into the same piece of meat or poultry. By the same token, the product can have a diameter, in the case of beads and pellets of from about 0.01 inch to about 0.25 inches and a length, if not spherical, up to about 1 inch long. Such products are particularly useful for rice, and other grains and particulate foods that require cooking, or can be mixed into other foods that require cooking in order to distribute the seasoning throughout the food during cooking.

The seasoning must be in powder form, and the particle size is critical in order that the seasoning will migrate in the food when released from the binder. The particle size is from about 2 mils to about 10 mils in diameter, and preferably from about 2 mils to about 6 mils in diameter, with the most preferable diameter being about 4 mils in diameter. The seasoning is either purchased from a supplier at the correct particle size or must be ground in a mill known in the art for this purpose.

Concerning the food binder, a variety of materials or ingredients may be used, provided the binder will result in a solid final product that is characterized with a lack of friability so that it can withstand ordinary handling in the kitchen and be pressed into meat or poultry without breaking up, the product retaining its solid form when inserted into the food until a predetermined condition is met. For example, during the heating of the food by baking or broiling or grilling, the binder will cease its function of binding (liquefy, dissolve or otherwise disintegrate) and release the seasonings into the food according to pre-established criteria. Known binders are presently available that according to manufacturer's specifications will perform according to appropriate criteria as necessary for the present invention. The criteria or conditions that need to be pre-established include temperature (liquefying when the temperature reaches 100 to about 140 degrees F., preferably 120 to 130 degrees F.), or rate of dissolution (dissolving after 5 to 60 minutes after insertion into the meat, fish or poultry) that will result in the binder releasing the seasoning to migrate throughout the food or work its magic in the meat, fish or poultry. For foods that are cooked in an aqueous medium, the temperature of cooking will guarantee disintegration.

Binders that are satisfactory in the present invention depend on the manner of mixing or compounding with the seasoning and the additional ingredients recommended by the manufacturer. The binder used also indicates the best technique to be used to obtain the product, whether the product is to be compressed, extruded or compacted to obtain the solid form. For example, one binder that is particularly useful for the present invention is sold by BASF Corporation under the tradename PLURONIC F127, which is binder consisting of a copolymer of ethylene oxide and propylene oxide. The advantage of this binder is that is can be used with seasonings to produce a solid product in appropriate form as described that will not breakup during handling or when pressed into food either directly into meat, fish or poultry or into an opening made in the meat, fish or poultry. Also, this binder has the advantage that it can be formulated, according to the instructions given by the manufacturer, so that it will disintegrate at a preselected or predetermined temperature. Therefore, when using this material as a binder to capture seasonings in solid form as described, it will disintegrate, and release the seasonings at the preselected or predetermined temperature while the food is being heated in an oven or on a grill. In the preferred embodiment for meat, fish and poultry, the preferred release temperature range is from about 100 degrees F. to about 140 degrees F., with the preferred release temperature range being about 120 to about 130 degrees F. Upon release, because of its small particle size, the seasoning migrates or otherwise spreads throughout the meat, fish or poultry doing "its thing", effecting seasoning throughout.

As noted previously, the binding of the seasoning can be carried out generally by subjecting the mixture of binder and seasoning to compression, extrusion or compaction, such techniques being well known and understood by persons skilled in the art from the literature and from the manufacturer's specifications and recommendations. Thus, no effort will be made herein to describe these processes or techniques in detail, nor to describe the additives or other ingredients recommended by manufacturers for such formulation or use. As noted above, in the preparation of the mixtures of binder and seasoning, other ingredients may be added, such as lubricants, mold release agents like magnesium stearate and so forth, the uses for which are all of which are well known in the art and contained in manufacturer's specifications and recommendations.

Regarding the binders which can be used, the following list is given, but the list is by no means limiting or all inclusive as persons skilled in the art will readily know what binders are suitable for use in the present invention from the descriptions herein. Suitable binders include PLURONIC F127; maltodextrins and corn syrup solids e.g. MALTRIN, a family of products made by Grain Processing Corporation; molasses; carnuba wax; carageenans; Aqualon, a product made by Hercules Corporation; alginates; PLASDONE and POLYPLASDONE, a range of products made by International Specialty Products as binders and disintergrants for wet and dry granulation processing and for direct compression; microcrystalline cellulose such as AVICEL made by FMC. As noted the list is not comprehensive and other binders will be known to those skilled in the art that are usable with the present invention.

The seasonings that are usable with the present invention are many and varied and are known to those practitioners of the culinary arts. The seasonings include all spices, herbs, condiments and flavorings. The seasonings can be used individually or in any combinations. To list only a few, there are garlic in clove or powder form, lemon peel, pepper, salt, oregano, parsley, dill, tarragon, thyme, cayenne pepper, rosemary, and so forth.

To make the product of the present invention, a suitable binder, comprising one or a combination or formulation of the known food binders, is mixed with one or a combination of seasonings in appropriate powder form and the mixture is either extruded, if in appropriate condition for processing in this manner, or subjected to compaction or compression in a suitable machine designed for this purpose, as is well known in the art, in order to obtain a solid elongated product of the cross sectional geometry noted previously, in stick, rod, thread, ribbon, or band form in whatever lengths desired. However, it is noted that the production of this product in lengths from about 0.25 inches up to about 18 inches is most preferable.

Figure 6:
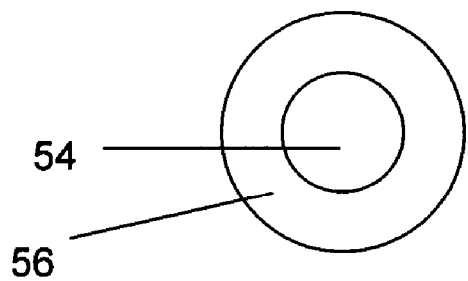
FIG. 6 shows a cross section of a product comprised an inner core of seasoning and binder surrounded by a shell.
Figure 7:
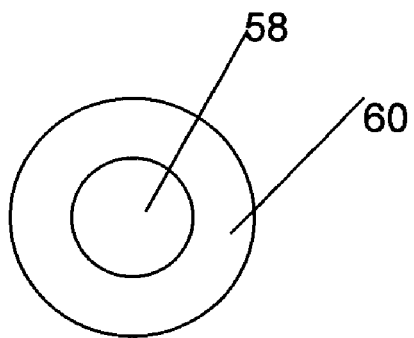
FIG. 7 shows a cross section of a product comprised of a solid core surrounded by a layer of seasoning and binder.

The novel product can have a cross section throughout in which the seasoning is uniformly distributed in the binder. Also, it is possible, see FIG. 5, to arrange the product so that it has two layers 50, 52 or more, like rings of a tree, in which the composition and/or concentration of the seasoning in the binder varies, or in which the mixture of seasonings is different in each layer. Further, the layers may have amounts of binders or contain other ingredients that will give the layers a differential release time. Further, it is possible to have the layers arranged to give a sustained release of the seasoning or seasoning composition during heating. Alternatively, see FIG. 6, the product may have a cross section in which the seasonings with a very small quantity of binder are contained in a core 54 that is surrounded by a thin annulus or shell of binder 56 to give the product the required rigidity and release time. In another form, see FIG. 7, the product may consist of a rigid core 58 of binder that carries a shell or annulus of seasonings 60 with a very small quantity of binder. The products shown in FIGS. 5–7 can be elongated as mentioned previously or in spherical form (pellets) with a diameter of from about 0.1 to about 0.35 inches. In the latter case, the products can be made using any known agglomeration and coating techniques, including fluidized bed techniques. In these fashions, the amount of binder associated with the seasonings is very small and easily releases the seasonings. The form of having an annulus or shell of binder, see FIG. 7, enables the shell 56 to gradually disintegrate (due to whatever action is appropriate, preferably temperature) during the initially phases of the heating of the food, and enables a quick release of the seasonings at the appropriate moment in the heating process. The important point in the method is that the binder melts, liquefies, dissolves or otherwise disintegrates to release the seasonings so it can penetrate throughout the food during heating, especially when the food reaches a particular temperature, preferably about 10° F. to about 60° F. below the temperature the food will reach at the end of heating. The temperature for release of the seasoning should be that temperature most favorable to the seasoning's action, as noted previously.

Referring now to the drawings, a novel device is shown that can be used for assisting in the insertion of solid seasoning products as described above. The device 10, as shown in FIGS. 1–4, consists of an elongated, axially extending shank 20 that is circular in cross section and terminates at its lower free end 22 in a sharp point 24. At the top end of shank 20 is a disc 26, integrally formed or attached. The disc 26 has a flat or slightly concave top surface 27 which can be engaged by the heel of the hand or the thumb so that pressure can be applied to the shank 20 to drive the point 24 into a piece of meat, fish or poultry and create a suitable opening in which to insert a solid seasoning product of the invention. The undersurface 29 of the disc is conical to provide reinforcement. The shank has an elongated, axially extending flat 28 that is formed on the outer surface of the shank 20. A ring 30 rides on the shank 20. Ring 30 is annular in configuration with the perimeter being circular. The opening on the inside of the ring 30 is also circular but defines a straight chord 32 that mates the flat 28. Ring 30 slides on shank 20 and can easily move up and down as shown by the double headed arrow in FIG. 1. A strap 34 is attached at one end to the outside of the ring 30 at one end and at its other end to the outside of the disc 26. The strap prevents the ring 30 and the shank 20 from disengaging whereby preventing loss due to misplacement of one part or the other. By maintaining the two parts connected by the strap 34, the device is always ready for its function. The ring 30, when its straight chord 32 is mated with the flat 28, slides easily on the shank 20, as noted. To lock the ring 30 in position on the shank 20, the ring is turned or rotated on the shank 20 so that the straight chord 32 is remove from the flat 28 and rotated into contact with a portion of shank 20 that has a circular surface. In this position due to the press fit between the ring 30 and shank 20, the ring 30 is locked in place on the shank 20 and thereby acts as a stop so that when the shank is pressed into a piece of meat or poultry, it can only go in to the food the distance from the point 24 to the ring 30. In short, the arrangement is a gauge for setting the depth of an opening made in the food item. After an opening has been made, a solid seasoning product, according to the invention, as described above, is inserted into the opening fully. This process is repeated at spaced locations on the piece of meat or poultry being seasoned. The inserted solid seasoning product may be of a length and diameter equal to the opening produced by the operation of the novel device. Alternatively, the seasoning product may have a much longer length so that after insertion to the depth possible, it is broken or cut off at the surface of the meat or poultry, and the remainder used again until no usable length is remaining.

Figure 8:
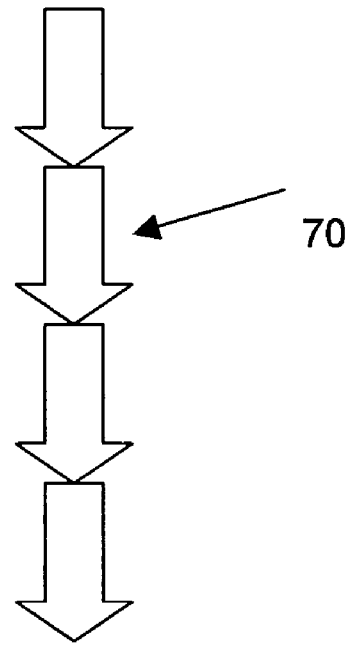
FIG. 8 shows a series of pegs of seasoning and binder strung together as a rigid product.

Although the device has good utility, it is still possible that the solid seasoning product of the invention can be used directly by being pushed into the meat, fish or poultry without an opening being made in advance. Also, the solid seasoning product can be profiled to have a point or reduced section at one end to facilitate the pushing into the meat or poultry. This will result in the solid seasoning product being one of peg-shaped, arrow-shaped or wedged-shaped, and may even be of a string 70 of such shapes as shown in FIG. 8.

With respect to use of the product as a bead or pellet either spherical, cylindrical or elongated or square for cooked foods such as rice, the product is simply mixed into the food, which usually is in particulate form, and the product will disintegrate during cooking and be distributed substantially uniformly throughout the food, thereby flavoring or seasoning in a very efficacious manner.

Whereas the invention has been shown and described in terms of preferred embodiments, nevertheless changes and modifications are possible which do not depart from the teachings herein. Such modifications and changes as are apparent to one skilled in the art are deemed to fall within the purview of the invention as claimed.

What is claimed is:

1. A method for seasoning a food comprised of meat, fish, poultry, rice, grains and other particulate foods required to be heated to be prepared for consumption comprising the steps of:
 (a) selecting a food to be seasoned;
 (b) preparing a solid seasoning to be inserted into the selected food by mixing a solid seasoning in powder form having a particle size of from about 2 mils to about 10 mils in diameter and a binder consisting of ethylene oxide and propylene oxide disintegratable at a temperature of from about 100 degrees F. to about 140 degrees F., wherein the amount of binder to seasoning is from about 0.1% by weight to about 10% by weight;

(c) applying pressure to the mixed seasoning to produce a solid mass in an elongated form of one of a stick, rod, thread, band and ribbon and in the shape of one of an elongated peg-shape having a sharp end and an elongated wedge shape having a sharp edge and having a thickness of from about 20 mils to 250 mils and being capable of being manually inserted into a solid food while retaining its shape;

(d) manually inserting the mixed seasoning elongated solid mass into the selected food with the mixed elongated seasoning solid mass retaining its shape after being manually inserted into the selected food;

(e) heating the selected food to a temperature of from about 100 degrees F. to about 140 degrees F. so that the binder of the mixed seasoning elongated solid mass is disintegrated;

(f) releasing the seasoning from the disintegrated solid mass when the binder is disintegrated;

(g) causing the released seasoning to migrate through and to season the selected food; and (h) thereafter heating the selected food above 140 degrees F. to prepare the seasoned selected food for consumption.

2. A product for seasoning a food comprised of meat, fish, poultry, rice, grains and other particulate foods required to be heated to be prepared for consumption comprising:

(a) a seasoning to be inserted into or mixed with a selected food composed of a seasoning in powder form having a particle size of from about 2 mils to about 10 mils in diameter;

(b) a binder consisting of a copolymer of ethylene oxide and propylene oxide disintegratable at a temperature of from about 100 degrees F. to about 140 degrees F., combined with the seasoning wherein the amount of binder to seasoning is from about 0.1% by weight to about 10% by weight;

(c) the combined seasoning and binder being distributed throughout a compacted solid mass wherein the solid mass is in an elongated form of one of a stick, rod thread, band and ribbon and wherein the solid mass is in the form of one of an elongated peg-shape having a sharp end and an elongated wedge-shape having a sharp edge and having a thickness of from about 20 mils to about 250 mils and having a rigidity that enables the elongated solid mass to be manually inserted into or mixed with a solid food with the solid mass retaining its shape; (d) whereby when the elongated solid mass is inserted into the selected food, and the selected food heated so that binder reaches a temperature of from about 100 degrees F. to about 140 degrees F., the binder of the solid mass will disintegrate and release the seasoning from the disintegrated solid mass causing the released seasoning to migrate through and to season the selected food whereupon the selected food can be further heated above 140 degrees F. to prepare the seasoned selected food for consumption.

* * * * *